US012649525B2

(12) United States Patent
Handa

(10) Patent No.: US 12,649,525 B2
(45) Date of Patent: Jun. 9, 2026

(54) WIPER BRACKET

(71) Applicant: ISUZU MOTORS LIMITED, Tokyo (JP)

(72) Inventor: Masaki Handa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 294 days.

(21) Appl. No.: 18/552,366

(22) PCT Filed: Mar. 23, 2022

(86) PCT No.: PCT/JP2022/013384
§ 371 (c)(1),
(2) Date: Sep. 25, 2023

(87) PCT Pub. No.: WO2022/202874
PCT Pub. Date: Sep. 29, 2022

(65) Prior Publication Data
US 2024/0166267 A1     May 23, 2024

(30) Foreign Application Priority Data

Mar. 25, 2021    (JP) ................................. 2021-051503

(51) Int. Cl.
*B62D 25/08* (2006.01)
*B60S 1/04* (2006.01)
(52) U.S. Cl.
CPC .......... *B62D 25/081* (2013.01); *B60S 1/0441* (2013.01)
(58) Field of Classification Search
CPC ...... B60S 1/043; B60S 1/0433; B60S 1/0436; B60S 1/0438; B60S 1/0441; B60S 1/0444; B62D 25/081
(Continued)

(56) References Cited

U.S. PATENT DOCUMENTS

2003/0001407 A1* 1/2003 Hoshikawa ............ B62D 21/15
                                                    15/250.31
2003/0178873 A1* 9/2003 Kato ..................... B60S 1/0488
                                                    15/250.31
(Continued)

FOREIGN PATENT DOCUMENTS

CN       107128372 A      9/2017
JP       H11-217061 A     8/1999
(Continued)

OTHER PUBLICATIONS

Patent Cooperation Treaty, International Search Report, Application No. PCT/JP2022/013384, dated May 31, 2022, in 6 pages.
(Continued)

*Primary Examiner* — Gregory A Blankenship
(74) *Attorney, Agent, or Firm* — PROCOPIO, CORY, HARGREAVES & SAVITCH LLP

(57) ABSTRACT

A wiper bracket includes a wiper support plate portion including a shaft support portion which rotatably supports a pivot shaft of the wiper, a leg portion having a shape of a plate which intersects an upper-lower direction and extending from a lower end side of the wiper support plate portion toward the dash panel on a rear side, and a fixed plate portion having a shape of a plate which intersects the front-rear direction, extending upward or downward from a rear end of the leg portion, and fixed to the dash panel. The leg portion includes an easily deformable portion which is easy to deform when a load in the front-rear direction is input.

4 Claims, 3 Drawing Sheets

(58) Field of Classification Search
USPC ............. 296/192, 96.21, 96.15, 96.17, 96.22
See application file for complete search history.

(56) References Cited

U.S. PATENT DOCUMENTS

| | | | | |
|---|---|---|---|---|
| 2011/0285173 A1* | 11/2011 | Ishii | ..................... | B60S 1/0433 |
| | | | | 296/192 |
| 2017/0247057 A1 | 8/2017 | Tatsuwaki | | |
| 2019/0299935 A1* | 10/2019 | Sakakibara | ........... | B60S 1/3488 |
| 2024/0166267 A1* | 5/2024 | Handa | .................. | B60S 1/0441 |
| 2025/0083632 A1* | 3/2025 | Sasaki | ....................... | B60S 1/18 |

FOREIGN PATENT DOCUMENTS

| | | | |
|---|---|---|---|
| JP | H11-240424 | A | 9/1999 |
| JP | 2000-127909 | A | 5/2000 |
| JP | 2000-302015 | A | 10/2000 |
| JP | 2014-141208 | A | 8/2014 |
| JP | 2014-189160 | A | 10/2014 |
| JP | 2017-013739 | A | 1/2017 |
| JP | 2017-206044 | A | 11/2017 |

OTHER PUBLICATIONS

Patent Cooperation Treaty, WOSA, Application No. PCT/JP2022/013384, dated May 31, 2022, in 4 pages.
Chinese Patent Office, Office Action, Application 202280023968.9 on Mar. 31, 2026, in 12 pages.

\* cited by examiner

WIPER BRACKET

CROSS-REFERENCE TO RELATED APPLICATIONS

This application is US National Stage of International Patent Application PCT/JP2022/013384, filed Mar. 23, 2022, which claims benefit of priority from Japanese Patent Application JP2021-051503, filed Mar. 25, 2021, the contents of both of which are incorporated herein by reference.

TECHNICAL FIELD

The present disclosure relates to a wiper bracket.

BACKGROUND ART

Patent Literature 1 discloses a wiper bracket including an impact absorbing portion. The wiper bracket includes an inclined portion and a vertical portion which extends substantially vertically from a lower end of the inclined portion and is connected to a horizontal portion. The wiper bracket is formed in a substantially L shape as a whole in a side view, and is provided with a rib on a side edge portion. The wiper bracket further includes a tube portion, which rotatably supports a pivot shaft, at one end portion of the wiper bracket on an inclined portion side. The wiper bracket is formed with attachment holes in respective member corner portions in the vicinity of the tube portion, and a vehicle rear side end portion of the wiper bracket is fixed to a cowl panel by attachment bolts inserted through the attachment holes. On the other hand, the wiper bracket is formed with an attachment hole, through which an attachment bolt is inserted, in the other end portion on a horizontal portion side, and the wiper bracket is fixed to a horizontal portion of a suspension tower portion by the attachment bolt inserted through the attachment hole. The rib of the wiper bracket includes a small-thickness portion in a position on a window glass side relative to the attachment hole. When an impact load is applied to the wiper bracket due to deformation of a vehicle body, attachment bolts are detached from attachment holes, and the vehicle body is deformed and collides with the wiper bracket, the impact load acting on the wiper bracket exceeds a predetermined value, the small-thickness portion is deformed, and the inclined portion in the vicinity of the small-thickness portion is also deformed.

CITATION LIST

Patent Literature

Patent Literature 1: JPH11-240424A

SUMMARY OF INVENTION

Technical Problem

In a vehicle such as a truck, a wiper bracket is fixed to a dash panel standing on a front side of a vehicle compartment. Accordingly, when a pedestrian collides with a front surface of the vehicle, the pedestrian may collide with a portion where the wiper bracket is disposed. When the wiper bracket includes a portion rising forward from the dash panel on a vehicle body side (for example, a portion corresponding to the vertical portion of the wiper bracket which rises from the suspension tower portion on a vehicle body side described in Patent Literature 1), a pedestrian protection performance may be lowered since the portion has a high rigidity against a load from front.

An object of the present disclosure is to provide a wiper bracket which can ensure a pedestrian protection performance.

Solution to Problem

According to a first aspect of the present disclosure, there is provided a wiper bracket for attaching a wiper to a dash panel standing on a front side of a vehicle compartment, and the wiper bracket includes a wiper support plate portion, a leg portion, and a fixed plate portion. The wiper support plate portion includes a shaft support portion which rotatably supports a pivot shaft of the wiper, has a shape of a plate which intersects a front-rear direction, is disposed in front of the dash panel, and has an upper end side fixed to the dash panel. The leg portion has a shape of a plate which intersects an upper-lower direction, and extends from a lower end side of the wiper support plate portion toward the dash panel side at a rear side. The fixed plate portion has a shape of a plate which intersects the front-rear direction, extends upward or downward from a rear end of the leg portion, and is fixed to the dash panel. The leg portion includes an easily deformable portion which is easy to deform when a load in the front-rear direction is input.

In the above configuration, the leg portion extends from the lower end side of the wiper support plate portion toward the dash panel side at the rear side. That is, the leg portion rises forward from the dash panel side. The leg portion includes the easily deformable portion which is easy to deform when a load in the front-rear direction is input. For this reason, when a pedestrian collides with a front surface of a vehicle and even collides from front with the leg portion of the wiper bracket which rises forward from the dash panel side, the leg portion can be deformed by the easily deformable portion. Accordingly, an impact on the pedestrian can be reduced by the deformation of the leg portion, and a pedestrian protection performance can be ensured.

According to a second aspect of the present disclosure, the wiper bracket according to the first aspect includes a first bracket and a second bracket. The first bracket includes the wiper support plate portion. The second bracket includes the leg portion and the fixed plate portion, and is fixed to the first bracket. The second bracket integrally includes a bracket support plate portion, the leg portion, and the fixed plate portion. The bracket support plate portion has a shape of a plate which intersects the front-rear direction, extends upward or downward from a front end of the leg portion, and is fixed to the wiper support plate portion of the first bracket. The upper end side of the wiper support plate portion of the first bracket is fastened and fixed to the dash panel. The lower end side of the wiper support plate portion of the first bracket is fastened and fixed to the bracket support plate portion of the second bracket.

In the above configuration, the wiper bracket includes the first bracket and the second bracket, upper end side of the wiper support plate portion of the first bracket is fastened and fixed to the dash panel, and the lower end side of the wiper support plate portion of the first bracket is fastened and fixed to the bracket support plate portion of the second bracket. For this reason, when bolts or the like which fasten and fix the upper end side and the lower end side of the first bracket are loosened, the first bracket supporting the wiper can be detached from the second bracket and the dash panel. Accordingly, the wiper can be detached for inspection, replacement and the like.

Since the first bracket supporting the wiper can be detached from the second bracket, the first bracket can be detached from the vehicle body without allowing the second bracket to be detached from the dash panel. For this reason, it is not necessary to provide a bolt through hole for fixing the second bracket in the dash panel since the fixed plate portion of the second bracket can be fixed to the dash panel by spot welding, and the number of openings provided in the dash panel can be reduced.

According to a third aspect of the present disclosure, in the wiper bracket according to the first aspect or the second aspect, the leg portion includes a bending portion extending in a vehicle width direction and functioning as the easily deformable portion, and has a shape bending at the bending portion.

In the above configuration, the leg portion includes the bending portion extending in the vehicle width direction and functioning as the easily deformable portion, and has a shape bending at the bending portion. In this manner, the bending portion can function as the easily deformable portion simply by forming the leg portion in a shape bending at the bending portion, and thus the leg portion including the easily deformable portion can be easily formed.

According to a fourth aspect of the present disclosure, in the wiper bracket according to any one of the first to third aspects, the shaft support portion of the wiper support plate portion is disposed on the upper end side of the wiper support plate portion. Regions of the wiper support plate portion on both sides of the shaft support portion in the vehicle width direction are fixed to the dash panel.

In the above configuration, the shaft support portion of the wiper support plate portion is disposed on the upper end side of the wiper support plate portion, and regions of the wiper support plate portion on both sides of the shaft support portion in the vehicle width direction are fixed to the dash panel. For this reason, a strength of the shaft support portion of the wiper support plate portion can be ensured since the both sides of the shaft support portion of the wiper support plate portion in the vehicle width direction are supported from the dash panel side.

Advantageous Effects of Invention

According to the present disclosure, a pedestrian protection performance can be ensured.

DESCRIPTION OF EMBODIMENTS

Figure 1:
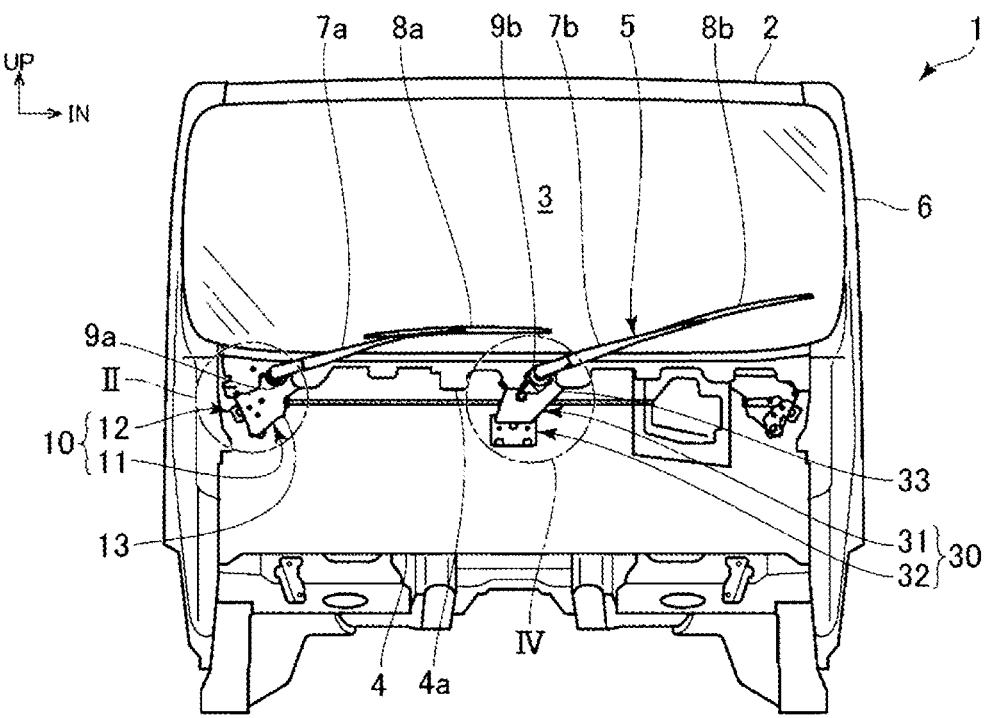
FIG. 1 is a front view of a dash panel of a vehicle to which a wiper bracket according to the present disclosure is applied.

Hereinafter, a wiper bracket according to the present disclosure will be described with reference to the drawings. In the drawings, FR indicates a front side of a vehicle, UP indicates an upper side, and IN indicates an inner side in a vehicle width direction. In the following description, a front-rear direction refers to a front-rear direction of the vehicle, and a left-right direction refers to a left-right direction in a state in which the vehicle faces forward.

As illustrated in FIG. 1, a vehicle 1 to which the wiper bracket according to the present disclosure is applied is a cab-over vehicle 1 in which a cab 2 is disposed substantially above an engine (not illustrated). The vehicle 1 includes a dash panel 4 which partitions a front side of a vehicle compartment 3.

The dash panel 4 stands along the vehicle width direction on a front side of the vehicle compartment 3. The dash panel 4 includes, on a front side, a front panel (not illustrated) constituting a front surface of the cab 2. The dash panel 4 includes, at an upper end portion on a front surface side, a convex portion 4a extending in the vehicle width direction in a state of protruding forward. The convex portion 4a is formed with a plurality of bolt through holes (not illustrated), and nuts (not illustrated) are fixed to the convex portion 4a on a rear surface side in positions communicating with the bolt through holes. FIG. 1 illustrates the front surface of the cab 2 in a state in which a front panel of the vehicle 1 is detached (state in which the dash panel 4 is exposed).

To the upper end portion of the front surface side of the dash panel 4 is attached a wiper device (wiper) 5 for wiping off water droplets and dust on a surface (front surface) of a windshield 6 of the vehicle 1. In the present embodiment, the wiper device 5 includes a wiper arm 7a, a wiper blade 8a, and a pivot shaft 9a which are disposed at a right outer end portion of the upper end portion of the dash panel 4 in the vehicle width direction, and a wiper arm 7b, a wiper blade 8b, and a pivot shaft 9b which are disposed at a central portion of the upper end portion of the dash panel 4 in the vehicle width direction. The wiper arms 7a, 7b have top end sides (upper end sides) tilted in the vehicle width direction about the pivot shafts 9a, 9b on base end sides (lower end sides). The wiper blades 8a, 8b are supported by the top end sides of the wiper arms 7a, 7b and extend along the surface of the windshield 6. The pivot shafts 9a, 9b are rotatable shafts driven by a wiper motor (not illustrated), are provided on the base end sides of the wiper arms 7a, 7b, extend in the front-rear direction, and support the wiper arms 7a, 7b such that the wiper arms 7a, 7b are tiltable to the left and the right.

Figure 2:
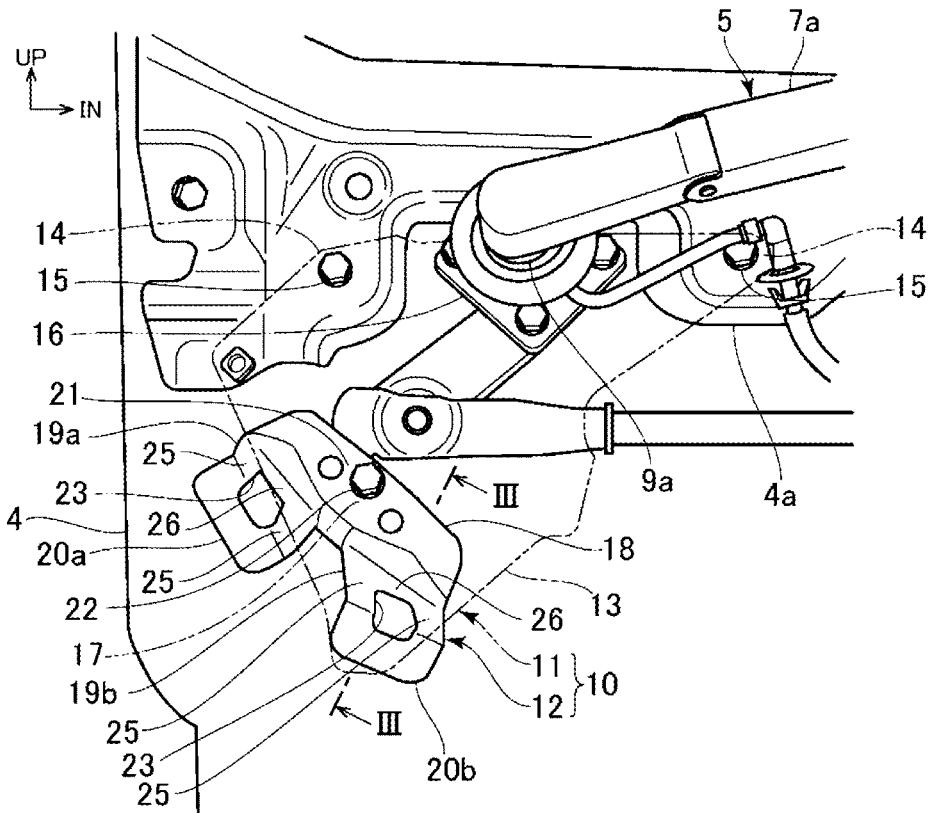
FIG. 2 is an enlarged view of a portion II in FIG. 1 and illustrates a wiper bracket according to a first embodiment of the present disclosure.
Figure 3:
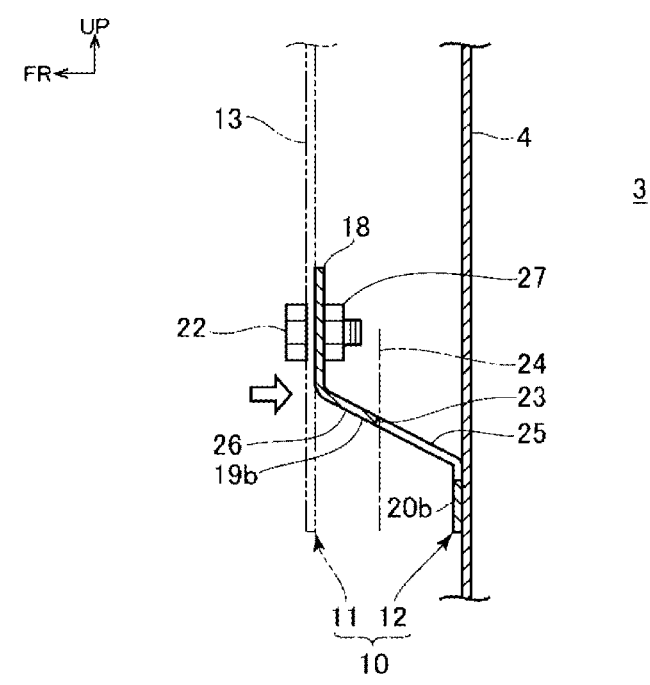
FIG. 3 is a cross-sectional view taken along a line III-III in FIG. 2.

A first embodiment of the present disclosure will be described with reference to the drawings. As illustrated in FIGS. 1 to 3, a wiper bracket 10 according to the present embodiment is a member used to attach the wiper device 5 to the dash panel 4, is fixed to the right outer end portion of the upper end portion of the dash panel 4 in the vehicle width direction, and supports the pivot shaft 9a of the wiper device 5. The wiper bracket 10 includes a first bracket 11 which supports the pivot shaft 9a, and a second bracket 12 which supports the first bracket 11 from a dash panel 4 side.

In the present embodiment, the first bracket 11 is implemented by one plate-shaped member (wiper support plate portion 13) which supports the pivot shaft 9a. The wiper support plate portion 13 has a shape of a plate which intersects the front-rear direction. The wiper support plate portion 13 is provided with, on both sides of an upper end portion in the vehicle width direction, left and right upper bolt fixing portions 14. The left and right upper bolt fixing portions 14 are formed with bolt through holes (not illustrated). The left and right upper bolt fixing portions 14 are fastened and fixed to the convex portion 4a of the dash panel 4. Specifically, when bolts 15 are inserted into the bolt through holes of the left and right upper bolt fixing portions 14 and the bolt through holes of the convex portion 4a of the dash panel 4 from front and bolts 15 are screwed into nuts and fastened, the left and right upper bolt fixing portions 14 of the wiper support plate portion 13 are fastened and fixed to the convex portion 4a of the dash panel 4. A region of the wiper support plate portion 13 which is below the convex portion 4a of the dash panel 4 is separated forward from a front surface of the dash panel 4. Between the left and right upper bolt fixing portions 14 at the upper end portion of the wiper support plate portion 13 (in a position sandwiched between the left and right upper bolt fixing portions 14), a shaft support portion 16 which supports the pivot shaft 9a is provided. That is, on an upper end side of the wiper support plate portion 13, regions which are on both sides of the shaft support portion 16 in the vehicle width direction are fixed to the dash panel 4. The shaft support portion 16 has a shaft through hole (not illustrated) penetrating the wiper support plate portion 13 in the front-rear direction. The shaft support portion 16 rotatably supports the pivot shaft 9a inserted through the shaft through hole. In a region (lower end side) of the wiper support plate portion 13 which is below the shaft support portion 16 is provided a lower bolt fixing portion 17. The lower bolt fixing portion 17 is formed with a bolt through hole (not illustrated). The lower bolt fixing portion 17 is fastened and fixed to the second bracket 12 to be described later.

The second bracket 12 is formed by bending one plate-shaped member, and includes a front plate portion (bracket support plate portion) 18, two intermediate plate portions (leg portions) 19a, 19b which are bent from a lower end of the front plate portion 18 and extend rearward, and two rear plate portions (fixed plate portions) 20a, 20b which are bent from rear ends of the two intermediate plate portions 19a, 19b and extend downward.

The front plate portion 18 of the second bracket 12 is a plate portion fixed to the first bracket 11, is formed in a shape of a plate which intersects the front-rear direction, and extends in a predetermined direction (in the present embodiment, a direction from an upper side on an outer side in the vehicle width direction to a lower side on an inner side in the vehicle width direction) along a rear surface of the first bracket 11 on a lower end side. The front plate portion 18 is provided with a bolt fixing portion 21. The bolt fixing portion 21 is formed with a bolt through hole (not illustrated), and a nut 27 (see FIG. 3) is fixed to a rear surface side of the bolt fixing portion 21 in a position communicating with the bolt through hole. The lower bolt fixing portion 17 of the wiper support plate portion 13 of the first bracket 11 is fastened and fixed to the bolt fixing portion 21 of the front plate portion 18. Specifically, when a bolt 22 is inserted into the bolt through hole of the lower bolt fixing portion 17 of the wiper support plate portion 13 of the first bracket 11 and the bolt through hole of the bolt fixing portion 21 of the front plate portion 18 of the second bracket 12 from front and the bolt 22 is screwed into the nut 27 and fastened, the lower bolt fixing portion 17 of the wiper support plate portion 13 of the first bracket 11 is fastened and fixed to the bolt fixing portion 21 of the front plate portion 18 of the second bracket 12. That is, a lower end side of the wiper support plate portion 13 of the first bracket 11 is fastened and fixed to the front plate portion 18 of the second bracket 12.

The two intermediate plate portions 19a, 19b of the second bracket 12 are plate portions which couple the front plate portion 18 and the rear plate portions 20a, 20b, and are formed in a shape of a plate which intersects the upper-lower direction. The two intermediate plate portions 19a, 19b are separated from each other on both sides in the vehicle width direction on a lower end side of the front plate portion 18, and bend and extend rearward from the lower end of the front plate portion 18. That is, the front plate portion 18 extends upward from front ends of the intermediate plate portions 19a, 19b. The two intermediate plate portions 19a, 19b each have an opening 23 which continues from a predetermined front-rear position 24 (front-rear position indicated by an alternate long and short dash line 24 in FIG. 3) to the rear plate portions 20a, 20b on a rear side. Of the two intermediate plate portions 19a, 19b, a rear region (easily deformable portion) 25 extending rearward from the predetermined front-rear position 24 has a smaller width (length in the vehicle width direction) than a front region 26 extending forward from the predetermined front-rear position 24, and is easy to deform when a load is input in the front-rear direction.

The two rear plate portions 20a, 20b of the second bracket 12 are plate portions fixed to the dash panel 4, and bend and extend downward from rear ends of the two intermediate plate portions 19a, 19b. The rear plate portions 20a, 20b are disposed to be separated from each other, extend along the front surface of the dash panel 4, and are fixed to the dash panel 4 (in the present embodiment, fixed by spot welding). In the present embodiment, rear end sides of the openings 23 of the intermediate plate portions 19a, 19b are continuous with upper end sides of the rear plate portions 20a, 20b.

In the wiper bracket 10 having the above configuration, of the intermediate plate portions 19a, 19b of the second bracket 12, the rear region 25 extending rearward from the predetermined front-rear position 24 has a smaller width than the front region 26 extending forward from the predetermined front-rear position 24, and is easy to deform when a load is input in the front-rear direction. For this reason, when a pedestrian collides with a front surface of the vehicle 1 and collides from front with a portion of the wiper bracket 10 which rises forward from the dash panel 4 side (intermediate plate portions 19a, 19b (positions indicated by white arrows in FIG. 3) of the second bracket 12), the intermediate plate portions 19a, 19b can be deformed at the rear regions 25 of the intermediate plate portions 19a, 19b.

In this manner, according to the present embodiment, even when a pedestrian collides from front with a relatively hard portion (intermediate plate portions 19a, 19b) of the wiper bracket 10 which rises forward from the dash panel 4, an impact on the pedestrian can be reduced by the deformation of the intermediate plate portions 19a, 19b, and thus a pedestrian protection performance can be ensured.

In the wiper support plate portion 13 of the first bracket 11, the upper bolt fixing portions 14 are fastened and fixed to the convex portion 4a of the dash panel 4 by the bolts 15, and the lower bolt fixing portion 17 is fastened and fixed to the second bracket 12 by the bolt 22. For this reason, when the bolts 15, 22 fastening and fixing the upper end side and the lower end side of the first bracket 11 are loosened, the first bracket 11 supporting the pivot shaft 9a of the wiper device 5 can be detached from the second bracket 12 and the dash panel 4. Accordingly, the wiper device 5 can be detached for inspection, replacement and the like.

Since the first bracket 11 supporting the wiper device 5 can be detached from the second bracket 12, the first bracket 11 can be detached from the vehicle body without allowing the second bracket 12 to be detached from the dash panel 4. For this reason, it is not necessary to provide a bolt through hole for fixing the second bracket 12 in the dash panel 4 since the rear plate portions 20a, 20b of the second bracket 12 can be fixed to the dash panel 4 by spot welding, and the number of openings provided in the dash panel 4 can be reduced.

On the upper end side of the wiper support plate portion 13 of the first bracket 11, the left and right upper bolt fixing portions 14 disposed on both sides of the shaft support portion 16 in the vehicle width direction are fixed to the dash panel 4. For this reason, a strength of the shaft support portion 16 of the wiper support plate portion 13 can be ensured since the both sides of the shaft support portion 16 of the wiper support plate portion 13 in the vehicle width direction are supported from the dash panel 4 side.

In the present embodiment, the first bracket 11 is implemented by one plate-shaped member (wiper support plate portion 13). Alternatively, the present disclosure is not limited thereto, and the first bracket 11 may be implemented by another member as long as the first bracket 11 includes the wiper support plate portion 13 which supports the pivot shaft 9a.

In the present embodiment, the second bracket 12 includes the front plate portion (bracket support plate portion) 18, the intermediate plate portions (leg portions) 19a, 19b, and the rear plate portions (fixed plate portions) 20a, 20b. Alternatively, the present disclosure is not limited thereto, and the second bracket 12 may be implemented by another member as long as the second bracket 12 includes a bracket support plate portion, a leg portion, and a fixed plate portion.

In the present embodiment, two intermediate plate portions 19a, 19b separated from each other in the vehicle width direction are provided. Alternatively, the present disclosure is not limited thereto, and for example, one intermediate plate portion (leg portion) which connects the intermediate plate portions 19a, 19b may be provided.

In the present embodiment, the intermediate plate portions 19a, 19b are each formed with the opening 23, and the rear region (easily deformable portion) 25 having a smaller width than the front region 26 functions as an easily deformable portion. Alternatively, the easily deformable portion is not limited thereto, and may be implemented by another member as long as the easily deformable portion is a portion which is easy to deform.

In the present embodiment, the intermediate plate portions (leg portions) 19a, 19b which bend from the lower end of the front plate portion (bracket support plate portion) 18 and extend rearward are provided. Alternatively, the present disclosure is not limited thereto, and a leg portion which bends from an upper end of a bracket support plate portion and extends rearward may be provided. That is, a bracket support plate portion may extend upward from a rear end of the leg portion.

In the present embodiment, two rear plate portions 20a, 20b separated from each other in the vehicle width direction are provided. Alternatively, the present disclosure is not limited thereto, and for example, one rear plate portion (fixed plate portion) which connects the rear plate portions 20a, 20b may be provided.

In the present embodiment, the rear plate portions (fixed plate portions) 20a, 20b which bend from the rear ends of the intermediate plate portions (leg portions) 19a, 19b and extend downward are provided. Alternatively, the present disclosure is not limited thereto, and a fixed plate portion which bends from a rear end of the leg portion and extends upward may be provided.

In the present embodiment, the shaft support portion 16 of the wiper support plate portion 13 is disposed between the left and right upper bolt fixing portions 14 at the upper end portion of the wiper support plate portion 13 (in a position sandwiched between the left and right upper bolt fixing portions 14). Alternatively, the present disclosure is not limited thereto, and the shaft support portion 16 may be disposed in a height position below the upper bolt fixing portions 14 and above the lower bolt fixing portion 17 of the wiper support plate portion 13. That is, regions of the upper end side of the wiper support plate portion 13 which are on both sides of the shaft support portion 16 in the vehicle width direction are fixed to the dash panel 4. Alternatively, the present disclosure is not limited thereto.

In the present embodiment, the wiper bracket 10 includes two brackets 11, 12 fixed to each other. Alternatively, the present disclosure is not limited thereto, and for example, the wiper bracket 10 may be implemented by one member integrally including the wiper support plate portion 13, the intermediate plate portions (leg portions) 19a, 19b, and the rear plate portions (fixed plate portions) 20a, 20b.

Next, a second embodiment of the present disclosure will be described with reference to the drawings. In a wiper bracket 30 according to the present embodiment, a second bracket 32 has a shape different from that in the first embodiment. The same components as those in the first embodiment are denoted by the same reference numerals, and description thereof is omitted.

Figure 4:
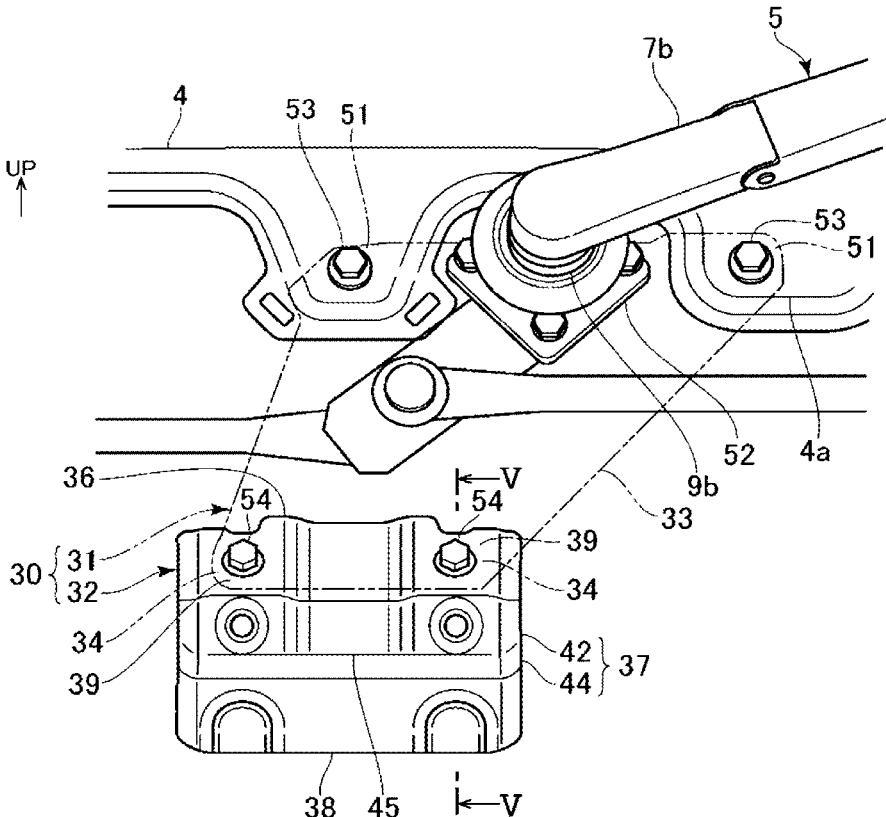
FIG. 4 is an enlarged view of a portion IV in FIG. 1 and illustrates a wiper bracket according to a second embodiment of the present disclosure.
Figure 5:
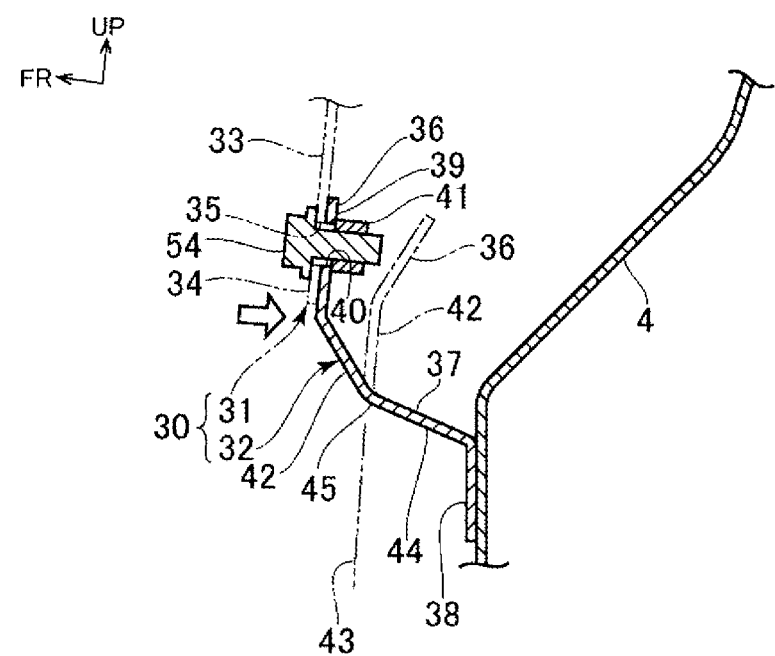
FIG. 5 is a sectional view taken along a line V-V in FIG. 4.

As illustrated in FIGS. 1, 4 and 5, the wiper bracket 30 according to the present embodiment is a member used to attach the wiper device 5 to the dash panel 4, is fixed to a central portion of an upper end portion of the dash panel 4 in the vehicle width direction, and supports the pivot shaft 9b of the wiper device 5. The wiper bracket 30 includes a first bracket 31 which supports the pivot shaft 9b, and the second bracket 32 which supports the first bracket 31 from a dash panel 4 side.

In the present embodiment, the first bracket 31 is implemented by one plate-shaped member (wiper support plate portion 33) which supports the pivot shaft 9a. The wiper support plate portion 33 has a shape of a plate which intersects the front-rear direction. The wiper support plate portion 33 is provided with, on both sides of an upper end portion in the vehicle width direction, left and right upper bolt fixing portions 51 fastened and fixed to the convex portion 4a of the dash panel 4. The left and right upper bolt fixing portions 51 are formed with bolt through holes (not illustrated). The left and right upper bolt fixing portions 51 are fastened and fixed to the convex portion 4a of the dash panel 4. Specifically, when bolts 53 are inserted into the bolt through holes of the left and right upper bolt fixing portions 51 and bolt through holes of the convex portion 4a of the dash panel 4 from front, the bolts 53 are screwed into nuts and fastened, the left and right upper bolt fixing portions 51 of the wiper support plate portion 33 are fastened and fixed to the convex portion 4a of the dash panel 4. A region of the wiper support plate portion 33 which is below the convex portion 4a of the dash panel 4 is separated forward from a front surface of the dash panel 4. Between the left and right upper bolt fixing portions 51 at the upper end portion of the wiper support plate portion 33 (in a position sandwiched between the left and right upper bolt fixing portions 51), a shaft support portion 52 which supports the pivot shaft 9b is provided. That is, on an upper end side of the wiper support plate portion 33, regions which are on both sides of the shaft support portion 52 in the vehicle width direction are fixed to the dash panel 4. The shaft support portion 52 has a shaft through hole (not illustrated) penetrating the wiper support plate portion 33 in the front-rear direction. The shaft support portion 52 rotatably supports the pivot shaft 9b inserted through the shaft through hole. In a region (lower end side) of the wiper support plate portion 33 which is below the shaft support portion 52, left and right lower bolt fixing portions 34 are provided. The left and right lower bolt fixing portions 34 are formed with bolt through holes 35. The left and right lower bolt fixing portions 34 are fastened and fixed to the second bracket 32 to be described later.

The second bracket 32 is formed by bending one plate-shaped member, and includes a front plate portion (bracket support plate portion) 36, an intermediate plate portion (leg portion) 37 which is bent from a lower end of the front plate portion 36 and extends rearward, and a rear plate portion (fixed plate portion) 38 which is bent from a rear end of the intermediate plate portions 37 and extends downward.

The front plate portion 36 of the second bracket 32 is a plate portion fixed to the first bracket 31, is formed in a shape of a plate which intersects the front-rear direction, and extends in the vehicle width direction along a rear surface of the first bracket 31 on a lower end side. The front plate portion 36 is provided with left and right bolt fixing portions 39. The left and right bolt fixing portions 39 are formed with bolt through holes 40, and nuts 41 are fixed to rear surface sides of the bolt fixing portions 39 in positions communicating with the bolt through holes 40. The left and right lower bolt fixing portions 34 of the wiper support plate portion 33 of the first bracket 31 are fastened and fixed to the left and right bolt fixing portions 39 of the front plate portion 36. Specifically, when bolts 54 are inserted into the bolt through holes 35 of the left and right lower bolt fixing portions 39 of the wiper support plate portion 33 of the first bracket 31 and the bolt through holes 40 of the left and right bolt fixing portions 39 of the front plate portion 36 of the second bracket 32 from front and the bolts 54 are screwed into the nuts 41 and fastened, the left and right lower bolt fixing portions 39 of the wiper support plate portion 33 of the first bracket 31 are fastened and fixed to the bolt fixing portions 39 of the front plate portion 36 of the second bracket 32. That is, a lower end side of the wiper support plate portion 33 of the first bracket 31 is fastened and fixed to the front plate portion 36 of the second bracket 32.

The intermediate plate portion 37 of the second bracket 32 is a plate portion which couples the front plate portion 36 and the rear plate portion 38, and is formed in a shape of a plate which intersects the upper-lower direction. The intermediate plate portion 37 bends and extends rearward from the lower end of the front plate portion 18. That is, the front plate portion 36 extends upward from a front end of the intermediate plate portion 37. The intermediate plate portion 37 includes a first region 42 which bends from the lower end of the front plate portion 18 and extends linearly rearward and downward to a predetermined front-rear position 43 (indicated by an alternate long and short dash line 43 in FIG. 5), and a second region 44 which bends from a rear end of the first region 42 and extends to a front surface of the rear dash panel 4. The predetermined front-rear position 43 is a front-rear position rearward of the lower end of the front plate portion 18 and forward of the dash panel 4. The second region 44 of the intermediate plate portion 37 is disposed above an imaginary line obtained by extending the first region 42 downward, bends from the rear end of the first region 42, and extends rearward and downward. That is, the intermediate plate portion 37 includes a bending portion (easily deformable portion) 45 which extends in the vehicle width direction and functions as an easily deformable portion, and has a bent shape at the bending portion 45. The bending portion 45 of the intermediate plate portion 37 extends in the vehicle width direction in a state of protruding forward and downward, and is easy to bend and deform when a load is input to the intermediate plate portion 37 in the front-rear direction.

The rear plate portion 38 of the second bracket 32 is a plate portion fixed to the dash panel 4, and bends and extends downward from the rear end of the intermediate plate portion 37 (second region 44). The rear plate portion 38 extends along the front surface of the dash panel 4 and is fixed to the dash panel 4 (in the present embodiment, fixed by spot welding).

In the wiper bracket 30 having the above configuration, the bending portion 45 of the intermediate plate portion 37 of the second bracket 32 extends in the vehicle width direction and is easy to bend and deform when a load is input to the intermediate plate portion 37 in the front-rear direction. For this reason, when a pedestrian collides with a front surface of the vehicle 1 and collides from front with a portion of the wiper bracket 30 which rises forward from the dash panel 4 side (intermediate plate portion 37 (position indicated by a white arrow in FIG. 5) of the second bracket 32), the intermediate plate portion 37 can be deformed at the bending portion 45 as indicated by the alternate long and short dash line in FIG. 5.

The intermediate plate portion 37 of the second bracket 32 includes the bending portion 45 which extends in the vehicle width direction and functions as an easily deformable portion, and has a bent shape at the bending portion 45. In this manner, the bending portion 45 can function as the easily deformable portion simply by forming the intermediate plate portion 37 in a shape bent at the bending portion 45, and thus the intermediate plate portion 37 including the easily deformable portion can be easily formed.

In this manner, according to the present embodiment, even when a pedestrian collides from front with a relatively hard portion (intermediate plate portion 37) of the wiper bracket 30 which rises forward from the dash panel 4, an impact on the pedestrian can be reduced by the deformation of the intermediate plate portion 37, and thus a pedestrian protection performance can be ensured.

In the wiper support plate portion 33 of the first bracket 31, the upper bolt fixing portions 51 are fastened and fixed to the convex portion 4a of the dash panel 4 by the bolts 53, and the lower bolt fixing portions 34 are fastened and fixed to the second bracket 32 by the bolts 54. For this reason, when the bolts 53, 54 fastening and fixing the upper end side and the lower end side of the first bracket 31 are loosened, the first bracket 31 supporting the pivot shaft 9b of the wiper device 5 can be detached from the second bracket 32 and the dash panel 4. Accordingly, the wiper device 5 can be detached for inspection, replacement and the like.

Since the first bracket 31 supporting the wiper device 5 can be detached from the second bracket 32, the first bracket 31 can be detached from the vehicle body without allowing the second bracket 32 to be detached from the dash panel 4. For this reason, it is not necessary to provide a bolt through hole for fixing the second bracket 32 in the dash panel 4 since the rear plate portion 38 of the second bracket 32 can be fixed to the dash panel 4 by spot welding, and the number of openings provided in the dash panel 4 can be reduced.

On the upper end side of the wiper support plate portion 33 of the first bracket 31, the left and right upper bolt fixing portions 51 disposed on both sides of the shaft support portion 52 in the vehicle width direction are fixed to the dash panel 4. For this reason, a strength of the shaft support portion 52 of the wiper support plate portion 33 can be ensured since the both sides of the shaft support portion 52 of the wiper support plate portion 33 in the vehicle width direction are supported from the dash panel 4 side.

In the present embodiment, the first bracket 31 is implemented by one plate-shaped member (wiper support plate portion 33). Alternatively, the present disclosure is not limited thereto, and the first bracket 31 may be implemented by another member as long as the first bracket 31 includes the wiper support plate portion 33 which supports the pivot shaft 9b.

In the present embodiment, the second bracket 32 includes the front plate portion (bracket support plate portion) 36, the intermediate plate portion (leg portion) 37, and the rear plate portion (fixed plate portion) 38. Alternatively, the present disclosure is not limited thereto, and the second bracket 32 may be implemented by another member as long as the second bracket 32 includes a bracket support plate portion, a leg portion, and a fixed plate portion.

In the present embodiment, the intermediate plate portion (leg portion) 37 which bends from the lower end of the front plate portion (bracket support plate portion) 36 and extends rearward is provided. Alternatively, the present disclosure is not limited thereto, and a leg portion which bends from an upper end of a bracket support plate portion and extends rearward may be provided. That is, a bracket support plate portion may extend upward from a rear end of the leg portion.

In the present embodiment, the bending portion 45 of the intermediate plate portion 37 protrudes forward, and may also protrude rearward.

In the present embodiment, the rear plate portion (fixed plate portion) 38 which bends from the rear end of the intermediate plate portion (leg portion) 37 and extends downward is provided. Alternatively, the present disclosure is not limited thereto, and a fixed plate portion which bends from a rear end of the leg portion and extends upward may be provided.

In the present embodiment, the shaft support portion 52 of the wiper support plate portion 33 is disposed between the left and right upper bolt fixing portions 51 at the upper end portion of the wiper support plate portion 33 (in a position sandwiched between the left and right upper bolt fixing portions 51). Alternatively, the present disclosure is not limited thereto, and the shaft support portion 52 may be disposed in a height position below the upper bolt fixing portions 51 and above the lower bolt fixing portion 34 of the wiper support plate portion 33. That is, regions of the upper end side of the wiper support plate portion 33 which are on both sides of the shaft support portion 52 in the vehicle width direction are fixed to the dash panel 4. Alternatively, the present disclosure is not limited thereto.

In the present embodiment, the wiper bracket 30 includes two brackets 31, 32 fixed to each other. Alternatively, the present disclosure is not limited thereto, and for example, the wiper bracket 30 may be implemented by one member integrally including the wiper support plate portion 33, the intermediate plate portion (leg portion) 37, and the rear plate portion (fixed plate portion) 38.

Although the present disclosure is described based on the above-described embodiments, the present disclosure is not limited to the content of the above-described embodiments, and can be appropriately modified without departing from the scope of the present disclosure. That is, it is needless to say that other embodiments, examples, operational techniques, and the like made by those skilled in the art based on the embodiments are all included in the scope of the present disclosure.

For example, in the first embodiment and the second embodiment, the wiper bracket according to the present disclosure is applied to the cab-over vehicle 1. Alternatively, the present disclosure is not limited thereto, and the wiper bracket is applicable to various vehicles including a dash panel standing on a front side of a vehicle compartment.

The present application is based on a Japanese patent application (JP2021-051503A) filed on Mar. 25, 2021, and contents thereof are incorporated herein by reference.

INDUSTRIAL APPLICABILITY

The wiper bracket according to the present disclosure can be widely applied to various vehicles in which a wiper is attached to a dash panel standing on a front side of a vehicle compartment.

REFERENCE SIGNS LIST

1: vehicle
3: vehicle compartment
4: dash panel
5: wiper device (wiper)
9a, 9b: pivot shaft
10, 30: wiper bracket
11, 31: first bracket
12, 32: second bracket
13, 33: wiper support plate portion
16, 52: shaft support portion
18, 36: front plate portion (bracket support plate portion)
19a, 19b, 37: intermediate plate portion (leg portion)
20a, 20b, 38: rear plate portion (fixed plate portion)
25: rear region of intermediate plate portion (easily deformable portion)
45: bending portion of intermediate plate portion (easily deformable portion)

The invention claimed is:

1. A wiper bracket for attaching a wiper to a dash panel standing on a front side of a vehicle compartment, the wiper bracket comprising:

a wiper support plate portion including a shaft support portion which rotatably supports a pivot shaft of the wiper, the wiper support plate portion having a shape of a plate which intersects a front-rear direction, being disposed in front of the dash panel, and having an upper end side fixed to the dash panel;

a leg portion having a shape of a plate which intersects an upper-lower direction and extending from a lower end side of the wiper support plate portion toward the dash panel on a rear side;

a fixed plate portion having a shape of a plate which intersects the front-rear direction, extending upward or downward from a rear end of the leg portion, and fixed to the dash panel;

a first bracket including the wiper support plate portion; and a second bracket including the leg portion and the fixed plate portion and fixed to the first bracket, wherein:

the leg portion includes an easily deformable portion which is easy to deform when a load in the front-rear direction is input;

the second bracket integrally includes a bracket support plate portion, the leg portion, and the fixed plate portion, the bracket support plate portion having a shape of a plate which intersects the front-rear direction, extending upward or downward from a front end of the leg portion, and fixed to the wiper support plate portion of the first bracket;

the upper end side of the wiper support plate portion of the first bracket is fastened and fixed to the dash panel; and the lower end side of the wiper support plate portion of the first bracket is fastened and fixed to the bracket support plate portion of the second bracket.

2. The wiper bracket according to claim 1, wherein the leg portion includes a bending portion extending in a vehicle width direction and functioning as the easily deformable portion, and has a shape bending at the bending portion.

3. A wiper bracket for attaching a wiper to a dash panel standing on a front side of a vehicle compartment, the wiper bracket comprising:

a wiper support plate portion including a shaft support portion which rotatably supports a pivot shaft of the wiper, the wiper support plate portion having a shape of a plate which intersects a front-rear direction, being disposed in front of the dash panel, and having an upper end side fixed to the dash panel;

a leg portion having a shape of a plate which intersects an upper-lower direction and extending from a lower end side of the wiper support plate portion toward the dash panel on a rear side; and a fixed plate portion having a shape of a plate which intersects the front-rear direction, extending upward or downward from a rear end of the leg portion, and fixed to the dash panel, wherein:

the leg portion includes an easily deformable portion which is easy to deform when a load in the front-rear direction is input;

the shaft support portion of the wiper support plate portion is disposed on the upper end side of the wiper support plate portion; and regions of the wiper support plate portion on both sides of the shaft support portion in a vehicle width direction are fixed to the dash panel.

4. The wiper bracket according to claim 3, wherein the leg portion includes a bending portion extending in a vehicle width direction and functioning as the easily deformable portion, and has a shape bending at the bending portion.

\* \* \* \* \*